US012322367B2

(12) United States Patent
Eng

(10) Patent No.: US 12,322,367 B2
(45) **Date of Patent: *Jun. 3, 2025**

(54) SOUND WAVE DEAD SPOT GENERATION

(71) Applicant: Comcast Cable Communications, LLC, Philadelphia, PA (US)

(72) Inventor: Adam Eng, Golden, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/066,230

(22) Filed: Dec. 14, 2022

(65) Prior Publication Data

US 2023/0122164 A1 Apr. 20, 2023

Related U.S. Application Data

(63) Continuation of application No. 17/111,245, filed on Dec. 3, 2020, now Pat. No. 11,551,658, which is a continuation of application No. 16/041,349, filed on Jul. 20, 2018, now Pat. No. 10,909,965.

(60) Provisional application No. 62/535,328, filed on Jul. 21, 2017.

(51) Int. Cl.

| | |
|---|---|
| ***H04R 27/00*** | (2006.01) |
| ***G10K 11/178*** | (2006.01) |
| ***H04R 29/00*** | (2006.01) |

(52) U.S. Cl.

CPC .. *G10K 11/17823* (2018.01); *G10K 11/17813* (2018.01); *G10K 11/17857* (2018.01); *G10K 11/17873* (2018.01); *H04R 27/00* (2013.01); *H04R 29/001* (2013.01); *G10K 2210/12* (2013.01); *G10K 2210/3031* (2013.01); *G10K 2210/3216* (2013.01); *H04R 2227/005* (2013.01); *H04R 2410/05* (2013.01); *H04R 2430/01* (2013.01)

(58) Field of Classification Search

CPC ....... G10K 11/17823; G10K 11/17813; G10K 11/17857; G10K 11/17873; G10K 2210/12; G10K 2210/3031; G10K 2210/3216; H04R 27/00; H04R 29/001; H04R 2227/005; H04R 2410/05; H04R 2430/01

USPC ........................................................ 381/71.4

See application file for complete search history.

(56) References Cited

U.S. PATENT DOCUMENTS

| | | | | |
|---|---|---|---|---|
| 7,103,187 | B1 | 9/2006 | Neuman | |
| 10,080,088 | B1 | 9/2018 | Yang et al. | |
| 10,909,965 | B2 * | 2/2021 | Eng | G10K 11/17823 |
| 11,551,658 | B2 * | 1/2023 | Eng | G10K 11/17813 |
| 2006/0262935 | A1 | 11/2006 | Goose et al. | |

(Continued)

OTHER PUBLICATIONS

US Patent Application filed on Dec. 3, 2020, entitled "Sound Wave Dead Spot Generation", U.S. Appl. No. 17/111,245.

*Primary Examiner* — Carolyn R Edwards
*Assistant Examiner* — Friedrich Fahnert
(74) *Attorney, Agent, or Firm* — BakerHostetler

(57) ABSTRACT

A speaker system uses destructive wave interference to generate "dead spots" with respect to an audio presentation. The signal for the dead spot generating device can be an inverted signal generated using the audio signal. In one embodiment, the inverted signal is generated using the audio signal, an indication of loudness at one or more active speakers, and a determination of the characteristics of the sound path from the one or more active speakers (including delay and attenuation).

18 Claims, 8 Drawing Sheets

(56) References Cited

U.S. PATENT DOCUMENTS

| | | | | |
|---|---|---|---|---|
| 2007/0297620 | A1* | 12/2007 | Choy | H04R 3/04 381/73.1 |
| 2008/0226087 | A1* | 9/2008 | Kinghorn | H04S 7/301 381/59 |
| 2013/0056581 | A1 | 3/2013 | Sparks | |
| 2014/0368734 | A1* | 12/2014 | Hoffert | H04N 21/47 348/564 |
| 2015/0098578 | A1 | 4/2015 | Dadu et al. | |
| 2016/0199241 | A1 | 7/2016 | Rapoport | |
| 2017/0061980 | A1 | 3/2017 | Jang et al. | |
| 2018/0082673 | A1* | 3/2018 | Tzanetos | G10K 11/175 |
| 2018/0082873 | A1 | 3/2018 | Ohmori et al. | |
| 2018/0268802 | A1 | 9/2018 | Urhonen | |
| 2019/0200175 | A1* | 6/2019 | Ylönen | H04B 1/401 |

* cited by examiner

SOUND WAVE DEAD SPOT GENERATION

CROSS-REFERENCE TO RELATED APPLICATION

This application is a continuation of U.S. patent application Ser. No. 17/111,245, filed Dec. 3, 2020, which is a continuation of U.S. patent application Ser. No. 16/041,349, filed Jul. 20, 2018, now U.S. Pat. No. 10,909,965, which claims the benefit of U.S. Provisional Patent Application No. 62/535,328, filed Jul. 21, 2017, which are hereby incorporated by reference in their entirety.

BACKGROUND

Home media systems, including home audio and audiovisual systems, typically include multiple speakers and have become increasingly popular, for example, with the advent of High Definition (HD) televisions. These systems can rival the experience of movie theaters and high-end audio presentations.

Often customers are not able to enjoy the audio portion of an audio or audiovisual presentation at a desired sound volume for fear of disturbing others, such as sleeping family members, in particular locations of a premise. This and other shortcomings are identified and addressed in this disclosure.

SUMMARY

Systems and methods are described for at least partially cancelling unwanted audio to generate a sound "dead spot" in a particular location of an environment during presentation of the audio portion of an audio or audiovisual presentation on a media system. The system may employ destructive wave interference or another technology for cancelling the unwanted audio. The system may buffer audio information associated with the audio portion of the presentation prior to its presentation on the media system and may generate, based on the buffered audio information, an inverted signal. The inverted signal may be generated using the buffered audio information, an indication of loudness at one or more audio sources of the media system, and a determination of characteristics of the sound path from the one or more audio sources including, for example, delay and attenuation. A dead spot generating device may then generate sound waves, based on the inverted signal, coincidentally with presentation of the audio portion by the one or more audio sources. The generated sound waves may destructively interfere, at the desired location, with sound waves emanating from the one or more audio sources of the media system that are presenting (i.e., playing) the audio portion of the presentation, thereby effectively creating a sound dead spot at the location.

Additional advantages will be set forth in part in the description which follows or may be learned by practice. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1A:
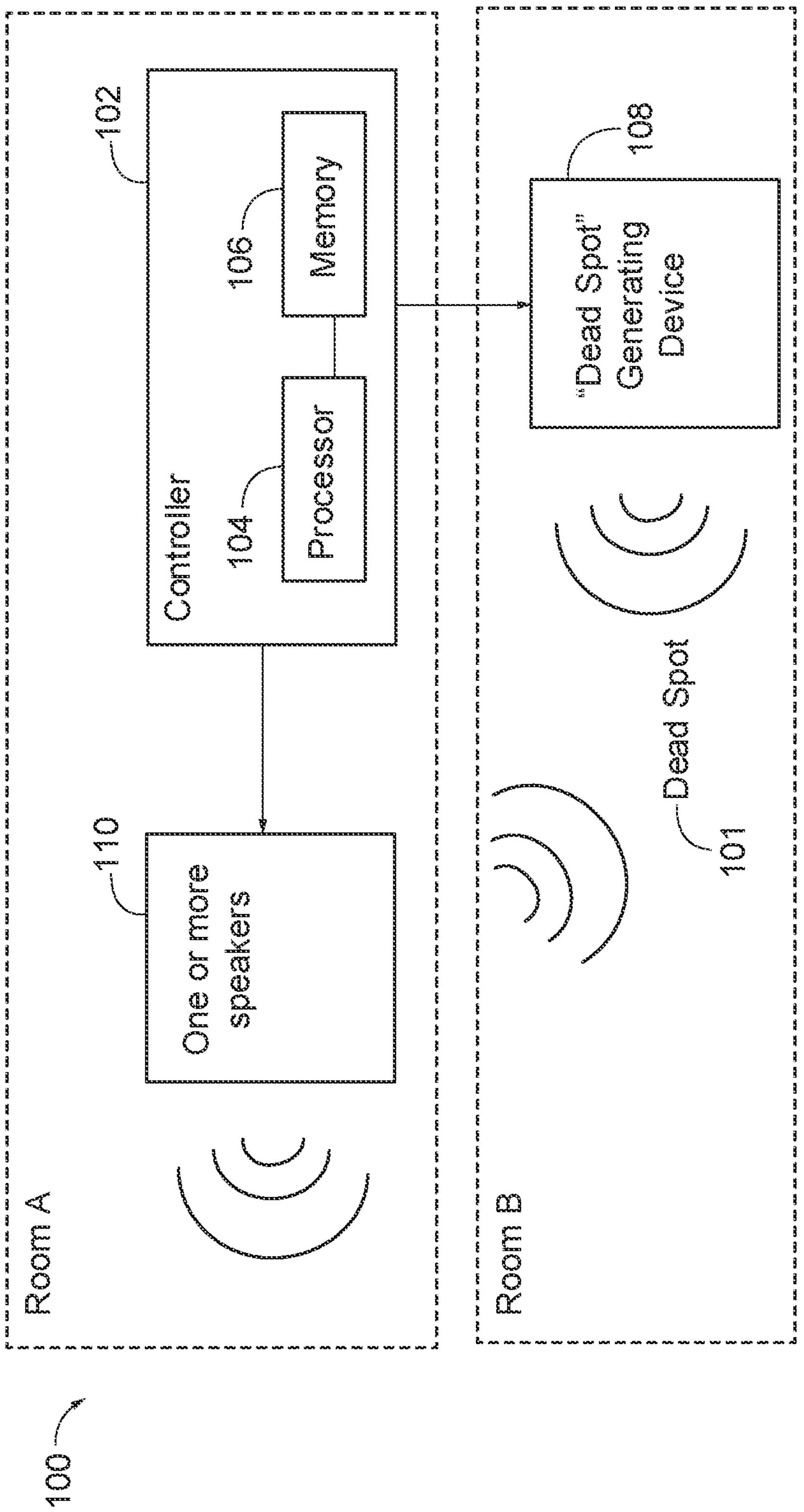
FIG. 1A shows a dead spot generating system that generates a sound "dead spot" at a desired location when the audio portion of an audiovisual presentation is being played.

A presentation system that produces sounds, such as a music system, home theater system, or other media system, typically includes one or more audio sources, such as one or more speakers, that present (i.e., play) the audio portion of a media file, such as a song, movie, television show, or other audio or audiovisual presentation. As described hereinafter, a dead spot generating system may be used to at least partially cancel the sound of the audio portion of a presentation at a desired location, thereby creating a sound "dead spot" at that location during presentation of the audio portion of a presentation on a media system. The system may employ destructive wave interference, or another technology for cancelling the unwanted audio. The system may buffer audio information associated with the audio portion of the presentation prior to its presentation on the media system and may generate, based on the buffered audio information, an inverted signal. The inverted signal may be generated using the buffered audio information, an indication of loudness at one or more audio sources of the media system, and a determination of characteristics of the sound path from the one or more active audio sources to the desired dead spot location. The characteristics of the sound path may comprise one or more of sound wave reflection phase shift, displacement, dampening, and time delay. A dead spot generating device may then generate sound waves, based on the inverted signal, coincidentally with presentation of the audio portion by the one or more audio sources. The generated sound waves may destructively interfere, at the desired location, with sound waves emanating from the one or more audio sources of the media system that are presenting (i.e., playing) the audio portion of the presentation, thereby effectively creating a sound dead spot at the location.

The sound from the audio portion of a presentation that will reach the location of a desired sound dead spot can be anticipated, because the system is able to process the buffered audio information (e.g., audio signal) for the audio portion of the presentation prior to it being played by the media system. This audio information can be combined, prior to playback by the media system, with other information, such as the current volume of the one or more audio sources (e.g., speakers) of the media system and characteristics of the sound path from the one or more audio sources, to determine how to produce additional sound waves that will affect (e.g., cancel) the sound from the media system that is reaching the location of the desired dead spot. These characteristics may include, for example, delay and attenuation characteristics, such as one or more of sound wave reflection phase shift, displacement, dampening, and time delay, Such an anticipatory dead spot generating system has timing advantages over prior systems that are reactive. These prior reactive systems, such as noise-cancelling headphones, use a microphone to detect ambient sound and then produce an inverted signal from the detected ambient sound. Such systems work best to remove low frequency oscillating noise (like the hum of an airplane) because of the delays involved with processing and producing an inverted signal.

By using audio information from the known or buffered audio information of the audio portion of a presentation, the present system can keep the dead spot generating sound waves closely aligned in time (i.e., coincident) with the sound emanating from the media system without a perceptible processing delay. Such a dead spot generating system is especially useful for people who want to watch a movie or TV show at a desired volume, yet do not want to disturb someone who is sleeping or trying to rest in another location. For example, the dead spot generating system may allow parents to watch a movie without worrying that the sound of the movie will be too loud for a sleeping child.

FIG. 1A shows an environment 100 in which a dead spot generating system may be deployed to generate a sound "dead spot" at a desired location 101 during presentation of the audio portion of a presentation on a media system. A controller 102 comprising a processor 104 and memory 106, which may be part of the media system used to play the audio portion of the presentation or may be a separate component, may receive and buffer the audio information (e.g., audio signal) of the audio portion of the presentation in the memory 106. The controller 102 may generate an inverted signal based on the audio information of the audio portion of the presentation. After or substantially concurrent with processing to generate the inverted signal, the controller 102 may pass the audio information (e.g., audio signal) of the audio portion of the presentation to the audio processing functionality of the media system (not shown) so that it can be presented (i.e., played) on one or more audio sources of the media system, such as one or more speakers 110. In the example of FIG. 1A, the one or more speakers 110 may produce sound that is desirable in one location (such as room A) but is undesirable in another location (such as location 101 in room B).

The inverted signal may be generated using the audio information of the audio portion, an indication of loudness at one or more audio sources of the media system, and a determination of the characteristics of the sound path from the one or more audio sources 110 including, for example, delay and attenuation characteristics, to the desired dead spot location 101. The determined characteristics of the sound path may comprise one or more of sound wave reflection phase shift, displacement, dampening, and time delay. Values representing these characteristics may be determined using a calibration process, and the determined values may be stored as calibration values for use when generating the inverted signal.

A dead spot generating device 108 may receive and process the inverted signal to generate sound waves that at least partially cancel, at the desired location 101, any sound waves coming from the one or more audio sources 110 of the media system that are playing the audio portion of the presentation, thereby effectively creating a sound dead spot at the location. The sound from the audio portion of the presentation that will reach the location 101 of the desired sound dead spot can be anticipated, because the controller 102 is able to process the buffered audio information (e.g., signal) for the audio portion of the presentation prior to it being played by the media system. This audio information can be combined, prior to presentation by the media system, with other information, such as the current volume of the one or more audio sources (e.g., speakers) of the media system and characteristics of the sound path from the one or more audio sources 110 to the desired location, including for example, delay and attenuation characteristics, to determine how to produce additional sound waves with the dead spot generating device 108 that will affect (e.g., at least partially cancel) the sound from the media system that is reaching the location 101 of the desired dead spot. The dead spot generating device 108 may comprise one or more speakers or some other device for producing the additional sound waves necessary to cancel the sound at the desired dead spot location 101.

The audio information (e.g., signal) of the audio portion of a presentation may be buffered, as needed, to allow more processing time for generation of the inverted signal. For example, the audio signal may be buffered for several seconds while the inverted signal is generated. This may allow the dead spot generating device 108 to better compensate for higher frequency and non-oscillatory sounds than a system with an active microphone, such as often employed in conventional noise-canceling headphones.

The dead spot generating device 108 may cancel the sound at the desired dead spot location 101 using the principle of destructive interference. According to that principle, if a sound wave is met by a sound wave of the same intensity and opposite phase, the sound waves may cancel and a dead spot may be created. Consider two waves (with the same amplitude, frequency, and wavelength) travelling in the same direction. Using the principle of superposition, the resulting wave displacement may be written as:

$$y(x,t)=y\ m\ \sin(kx-\omega t)+y\ m\ \sin(kx-\omega t+\phi)=2y\ m\ \cos(\phi/2)\sin(kx-\omega t+/2)$$

which is a travelling wave whose amplitude depends on the phase ($\phi$). When the two waves are in-phase ($\phi=0$), they interfere constructively and the result has twice the amplitude of the individual waves. When the two waves have opposite-phase ($\phi=180$), they interfere destructively and cancel each other out.

The dead spot generating system described herein may be useful in multiple scenarios. For example, a parent may calibrate the system such that the location of a baby's crib becomes a sound dead spot, and as a result, the parent may be able to watch TV at a desired volume while the baby is sleeping. Additionally, a user who wishes to watch the news in the morning may use the system to produce a dead spot at the location of a bed to ensure that a spouse is not awakened.

A sound wave generator or other logic, implemented in hardware or software, may be capable of inversing wave, shifting phase, and combining different speaker system outputs with dynamic decibel modifications to produce the inverted signal. In FIG. 1A, controller 102 may use processor 104 and memory 106 to produce audio signals sent to speakers 110 and to implement such sound wave generator to produce the inverted signal for sending to the dead spot generating device 108. Alternately, the dead spot generating device 108 may implement such a sound wave generator to generate the inverted signal itself. The dead spot generating device 108 may project a sound wave towards the location 101 of the desired dead spot such that the projected sound wave at least partially cancels out any sound waves at the location 101 that are emanating from the audio source (e.g., speakers 110).

The audio information (e.g., signal) for the audio portion of a presentation can be received from a DVD player, cable download, Internet streaming or any other source. The audio information can be pre-fetched before it is needed by the media system and buffered. The pre-fetched and buffered audio data may then be processed to produce the inverted signal.

The normal audio and the dead spot generating inverted signal may be sent to the speakers 110 and dead spot generating device 108, respectively, wirelessly or through a wired connection.

Figure 1B:
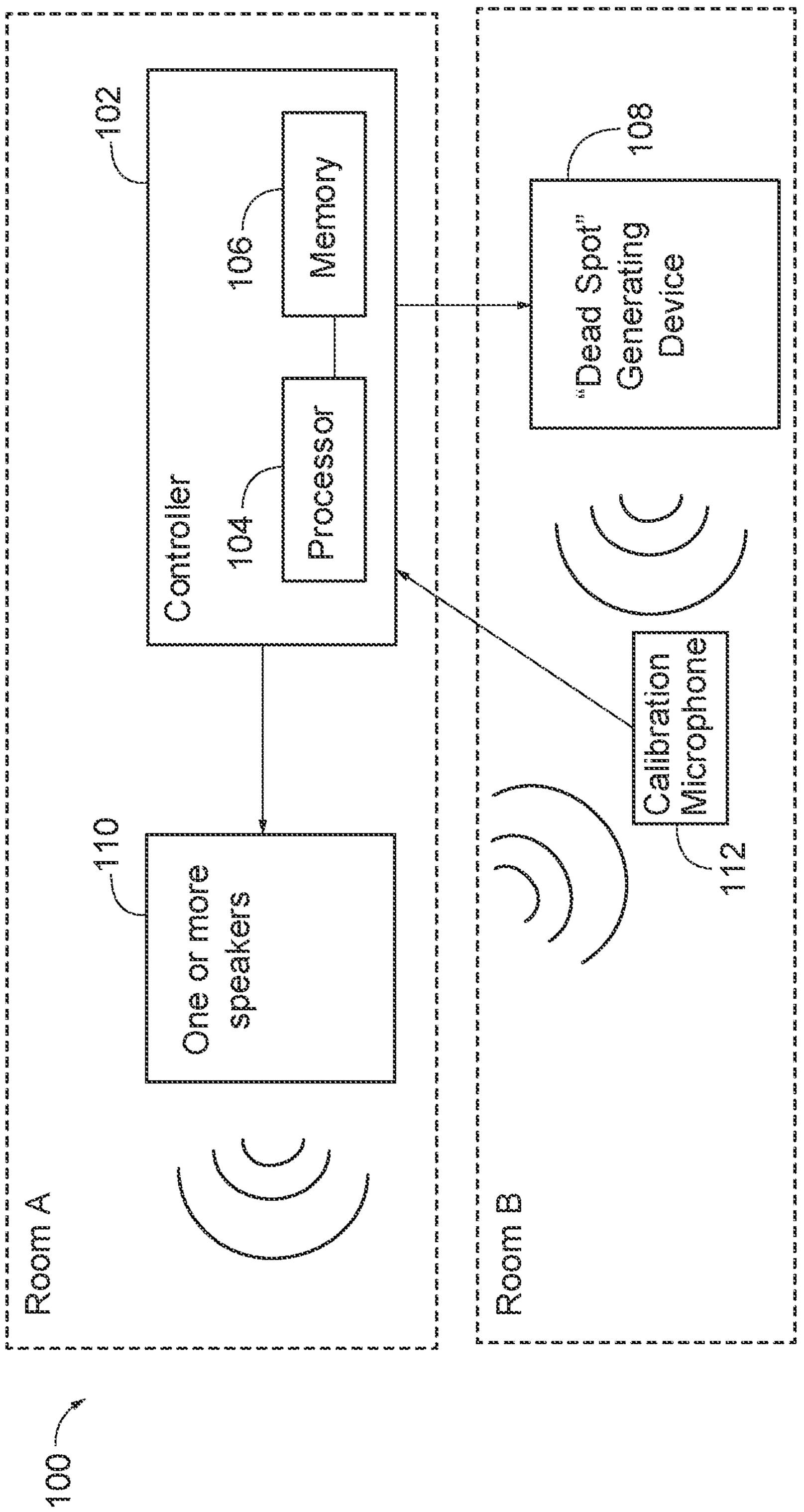
FIG. 1B illustrates the use of a microphone to calibrate the dead spot generating system.

FIG. 1B illustrates the use of a microphone 112 to calibrate the dead spot generating system. The calibration microphone 112 may be used during a calibration process but need not be used (and may be removed) during normal operation. Calibration may involve first positioning the calibration microphone 112 at the desired location for a sound dead spot. Next, a test signal(s) (e.g., sample audio signals) may be applied to each of the one or more audio sources of the media system, such as each of the speakers 110. The resulting sound waves reaching the location of the desired dead spot may then be picked up by the calibration microphone, and the audio signals received by the microphone may be examined. Calibration may also include the use of the dead spot generating device 108 to produce additional sound waves to attempt to cancel the sounds waves produced with the test signals. The calibration may comprise determining, at the location of the desired dead spot, values indicative of delay and attenuation characteristics for each speaker 110. The determined delay and attenuation characteristics may comprise one or more of sound wave reflection phase shift, displacement, dampening, and time delay. The values representing these characteristics may be stored as calibration values for use when generating the inverted signal.

The calibration microphone 112 may be used for calibrating the system, such as for determining the calibration values. The microphone 112 may be used to calibrate the system with respect to waveform alteration, combination and delay. Based on the calibration process, the system may account for the time required to process, transfer, and present sound waves.

Calibration using the microphone 112 may be performed for different speaker arrangements. For example, one calibration may be performed for a 5.1 channel speaker implementation, and another calibration may be done for a 7.1 channel speaker arrangement. Each speaker 101 may have unique sound considerations, such as orientation and speaker characteristics, that can be accounted for in different arrangements.

Figure 2:
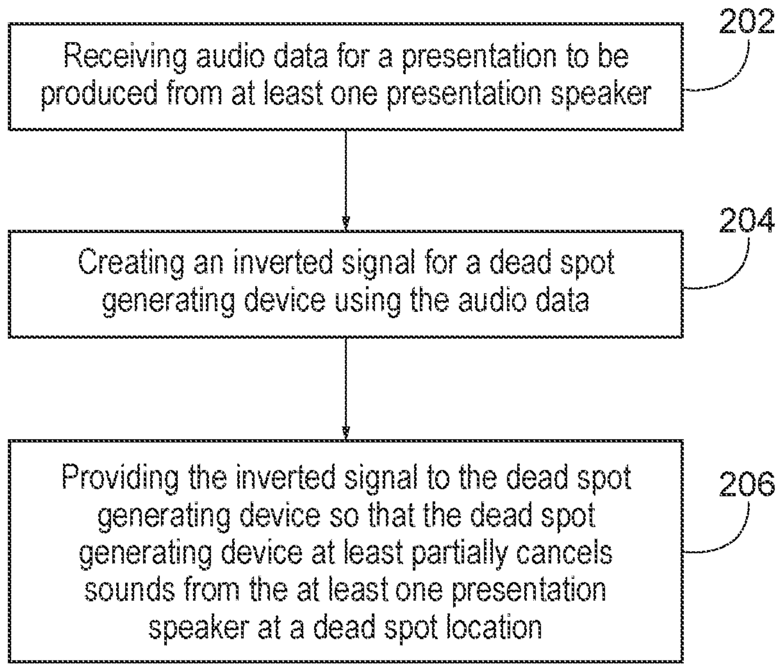
FIG. 2 is a flow diagram illustrating a method for generating a sound dead spot at a desired location during playback of the audio portion of an audiovisual presentation.

FIG. 2 is a flow diagram illustrating a method for generating a sound dead spot at a desired location during playback of the audio portion of an audio or audiovisual presentation.

In step 202, audio information for the audio portion of a presentation is received and buffered. The presentation may be intended to be played from one or more audio sources, such as one or more of the speakers 110 of FIGS. 1A and 1B. The presentation may be an audiovisual presentation, such as a movie, television show, or the like, or the presentation may be a purely audio presentation, such as a song, streaming audio, or the like.

In step 204, an inverted signal may be generated using the audio information of the audio portion of the presentation. As described below, the inverted signal may compensate for multiple speakers 110. The inverted signal may be generated using delay information since the undesired sound from one or more speakers 110 takes time to reach the intended dead spot 101. Additionally or alternatively, the inverted signal may be generated using attenuation characteristics since the undesired sound from one or more speakers 110 will be attenuated due to distance and intervening features such as walls, doors and the like before the sounds reach the intended dead spot 101.

The inverted signal may also be generated using information indicative of the volume set for each of the one or more speakers 110. Naturally, the louder the audio presentation through one or more speakers 110, the louder the sound waves from the dead spot generating device 108 need to be to compensate (i.e., cancel the sounds waves emanating from the speakers).

For example, the inverted signal may be dynamically adjusted for changes in speaker volume. Speaker volume information (for one or more speakers 110) may be determined via the Consumer Electronics Control (CEC) feature of High-Definition Multimedia Interface (HDMI) or in some other fashion. Alternately, remote button press counts can be monitored to determine the current volume setting(s) of a media system.

Referring again to FIG. 2, in step 206, the inverted signal is provided to the dead spot generating device 108, which produces from the inverted signal sound wave(s) that at least partially cancel the sound wave(s) at that desired dead spot location 101 that emanate from the one or more presentation speakers 110.

Figure 3:
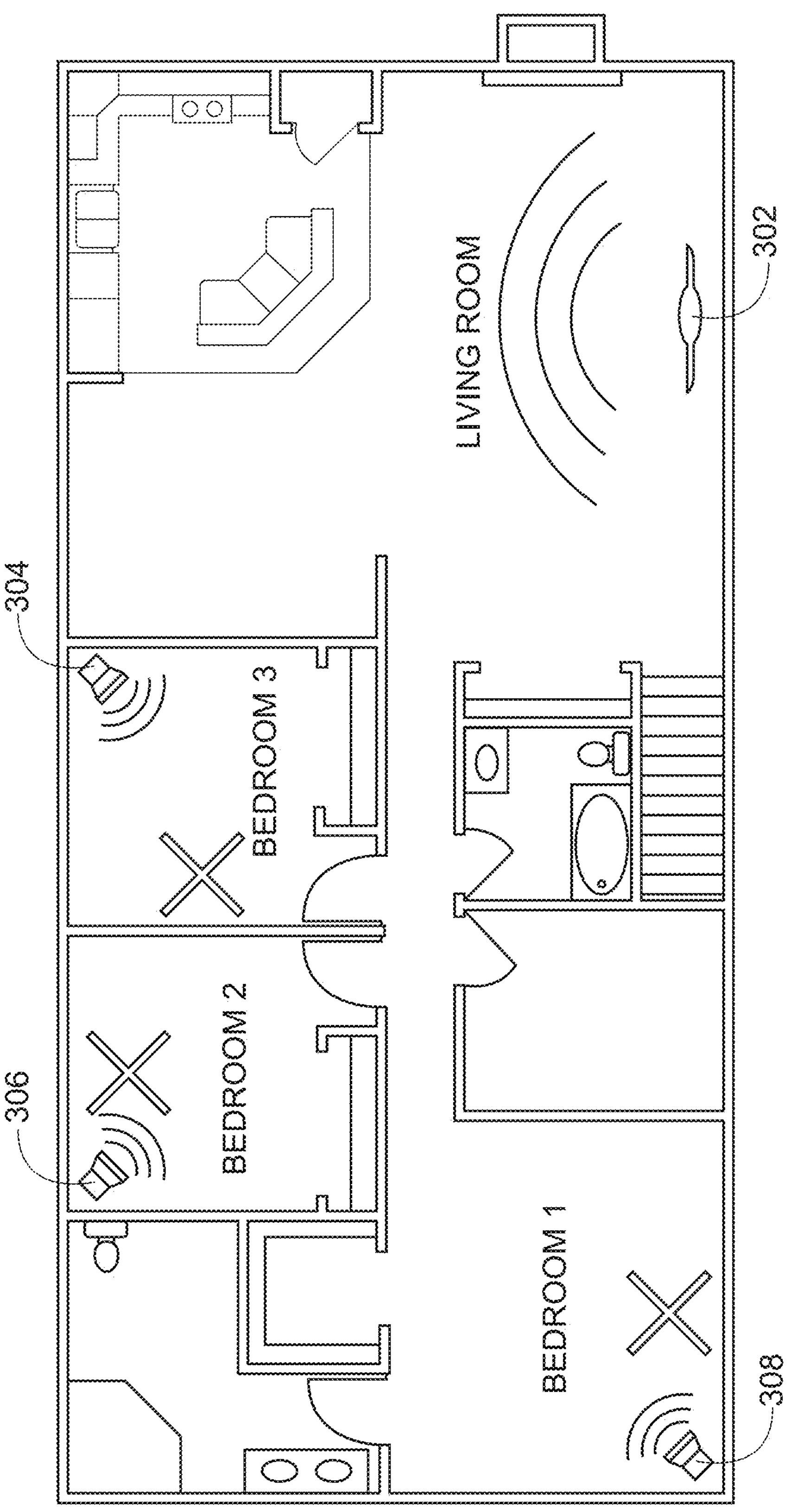
FIG. 3 depicts an example use of the dead spot generating system, in which the system is deployed in a home with a television in one room and multiple dead spot generating devices deployed in other rooms.

FIG. 3 depicts an example use of the dead spot generating system, in which the system is deployed in a home with a media system 302 in one room (e.g., living room) and multiple dead spot generating devices 304, 306, and 308 deployed in other rooms (e.g., bedrooms 1, 2, and 3) to generate dead spots in each of those rooms. Each dead spot and dead spot generating device 304, 306, 308 may be individually calibrated. As evident from the Figure, each of the dead spot locations (denoted in each room by an "X") may have a different distance and path from the sound waves produced by one or more audio sources (e.g., speakers) of the media system 302 in the living room.

Figure 4:
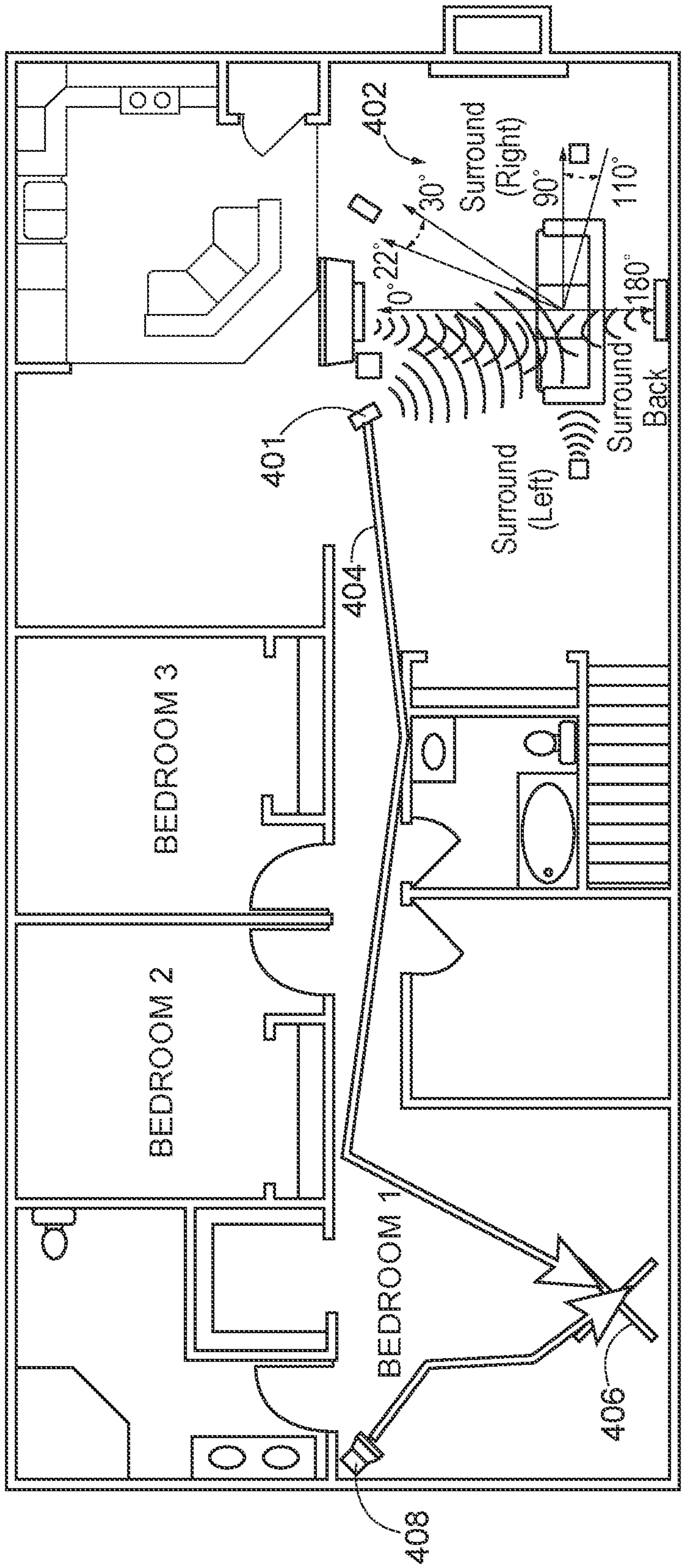
FIG. 4 illustrates a sound path from one speaker of a media system to a location at which a dead spot generating device is configured to generate a sound dead spot.

FIG. 4 illustrates a sound path 404 from one audio source (e.g., speaker) 401 of a media system 402 to a location 406 in an apartment at which a dead spot generating device 408 may be configured to generate a sound dead spot. As illustrated, the path 404 rebounds off locations in the apartment to eventually reach the dead spot location 406. Other audio sources (e.g., speakers) may have different audio paths (not shown). A calibration may be performed, using a calibration microphone (not shown) at the desired location 406, for the audio source 401 (and for each of any other audio sources individually).

Figure 5:
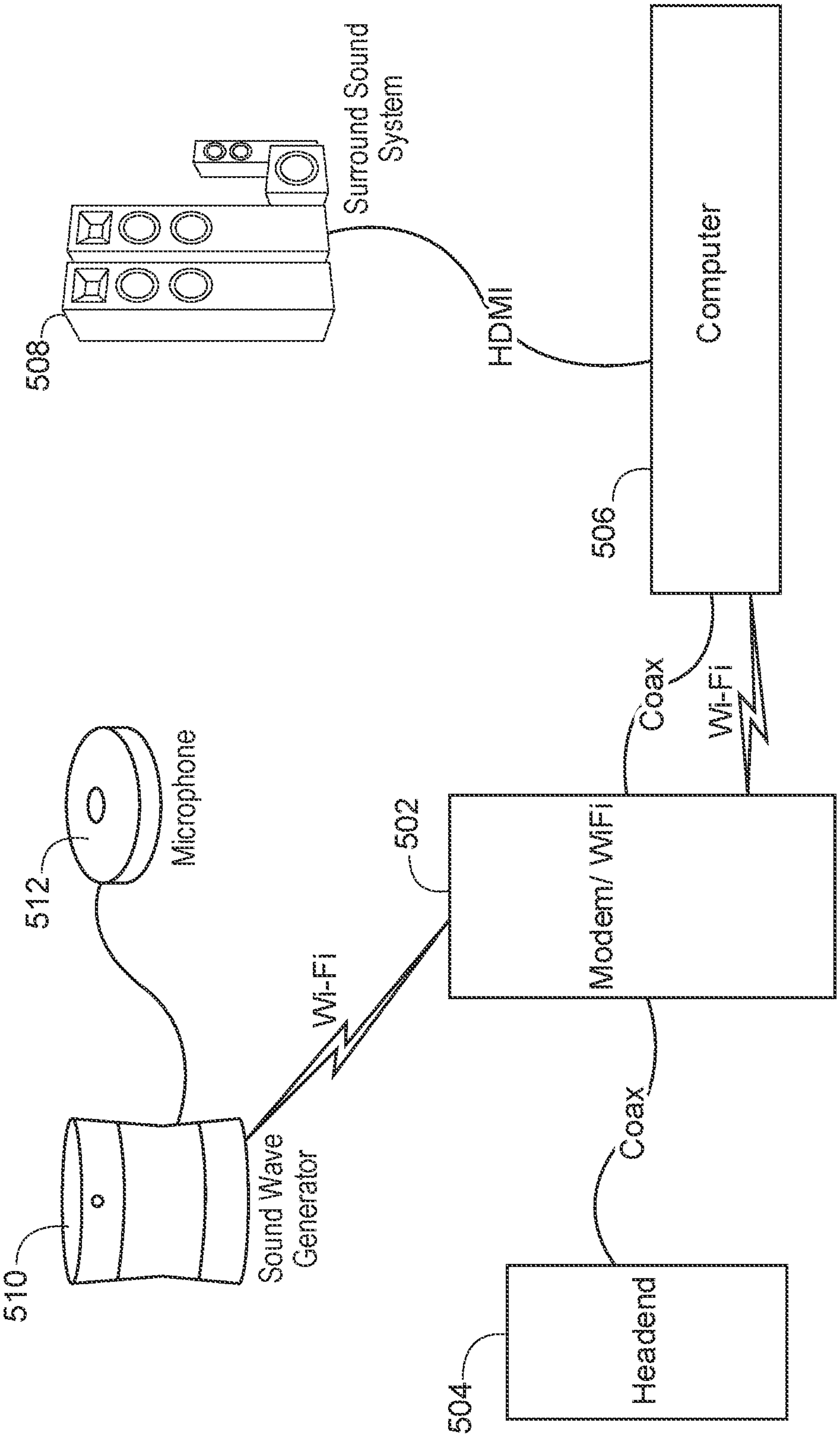
FIG. 5 depicts another configuration of a dead spot generating system.

FIG. 5 depicts another configuration of a dead spot generating system. In this example, the system comprises a cable modem/Wi-Fi unit 502, which receives an audio signal (as part of the audio portion of an audiovisual presentation for example) from a headend 504. The cable modem/Wi-Fi unit 502 may then forward the audio signal to a computer 506 (such as a cable box), which in turn may be configured to send the audio signal to one or more speakers 508 for presentation to a user. In this example, computer 506 may also create an inverted signal and sends the inverted signal to a dead spot generating device 510 through the cable modem/Wi-Fi unit 502. A microphone 512 may be used for calibration.

Although FIG. 5 depicts the modem/Wi-Fi unit 502 and the computer 506 as separate elements, the modem/Wi-Fi unit 502 and the computer 506 may alternatively be combined in a single unit. Additionally, FIG. 5 depicts an audio signal being received from the headend 504 through the modem/Wi-Fi unit 502. However, the dead spot generating system can also be useful during playback of audio signals of a stored or recorded presentation, such as a presentation played back from a Compact Disc (CD), digital video recorder (DVR), digital video disc (DVD) player, or from an Internet streaming system.

Figure 6:
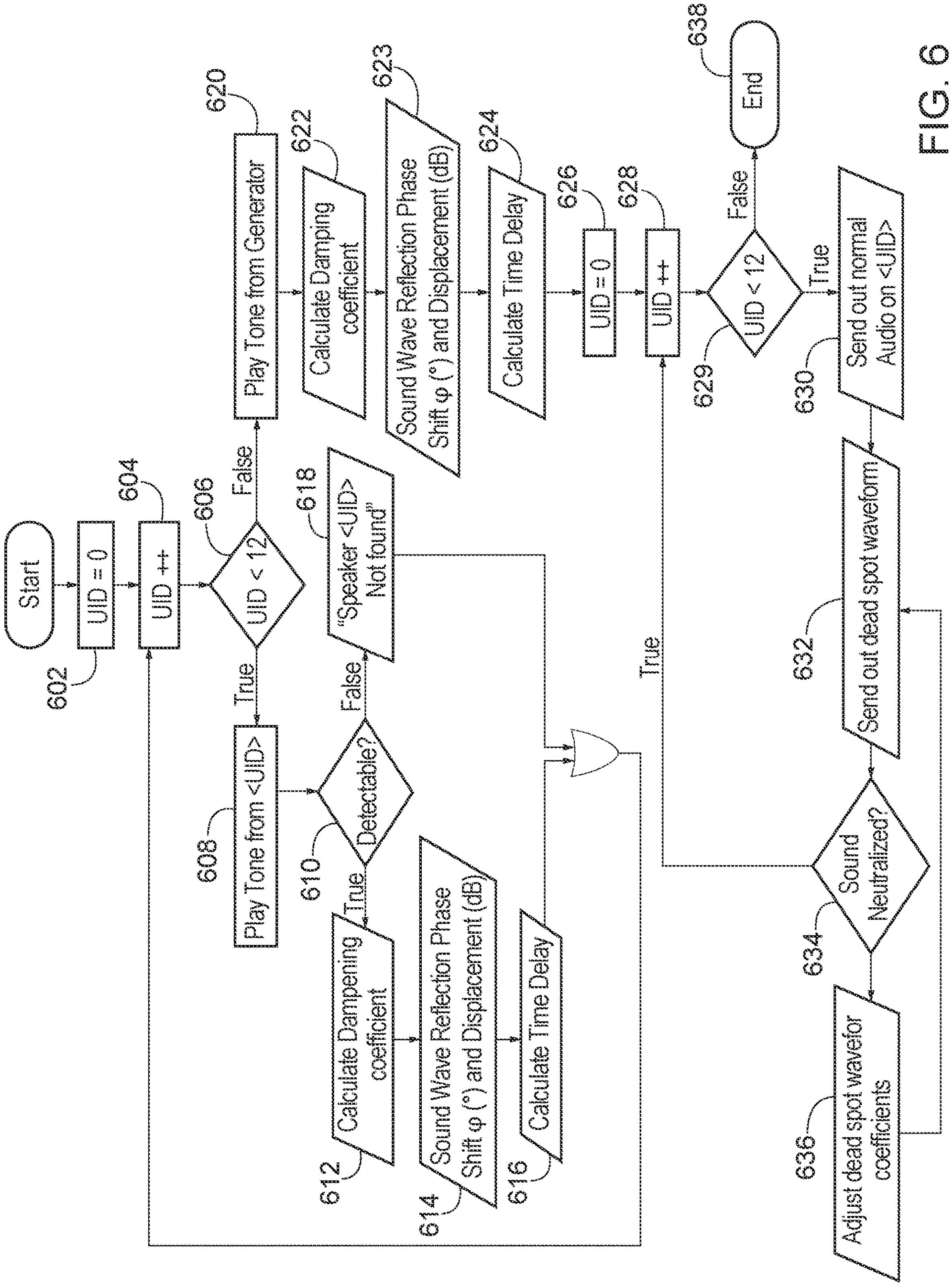
FIG. 6 is a flow diagram that illustrates a calibration process of the dead spot generating system.

FIG. 6 is a flow diagram that illustrates a calibration process of the dead spot generating system. In this example, a media system in conjunction with which the dead spot generating system is being used comprises eleven (11) presentation speakers having respective presentation speaker identifiers (UID) ranging from 1-11. It is understood, however, that in other examples, the media system may comprise a fewer or greater number of presentation speakers. Steps 604-616 comprise a first test loop of the process which uses a calibration microphone (e.g., the microphone 112 of FIG. 1B) to detect, for each presentation speaker, a test sound from the presentation speaker at a desired dead spot. The dead spot generating device (e.g., device 108 of FIGS. 1A and 1B) does not need to be active in these steps. Steps 620-624 determine characteristics of the dead spot generating device. Steps 636-638 comprise a second test loop that performs calibration of each presentation speaker while the dead spot generating device is active to adjust the operation of the dead spot generating device to better cancel sounds at the desired dead spot location that emanate from each presentation speaker.

In step 602, a current speaker identification (UID) value is initialized to zero before beginning the first test loop.

In step 604, the UID value is incremented. Thus, on the first past through the loop, the speaker with UID value “1” will be calibrated. For each subsequent pass through the loop, the UID value will be incremented until all of the speakers (eleven (11) in this example) are calibrated.

In step 606, it is checked if all of the speakers have been calibrated. In this example, because there are eleven speakers with UID’s ranging from 1-11, step 606 checks to see whether the current UID value is still less than “12”. After all eleven speakers have been subject to the first loop, the first loop will exit.

If not all of the speakers have been processed (i.e., UID<12), in step 608, a tone is played through the speaker identified by the current UID (“Speaker <UID>”).

In step 610, it is checked if the tone is detectable by the calibration microphone. That is, the system determines whether the calibration microphone detects a sound from the current speaker under test.

If so, in step 612, a dampening coefficient associated with the current speaker is determined. The dampening coefficient is determined by playing tones at various dB levels through the current speaker and capturing, with the microphone, differences in the dB level of the detected sound at the desired dead spot.

In step 614, a sound wave reflection phase shift ϕ value and a displacement (dB) value associated with the current speaker under test are determined. These values may be determined by playing sound waves through the speaker under test and then, using the microphone, capturing and identifying standard distortions from the environment, such as reflections and constructive/destructive interference.

In step 616, a time delay value for the speaker under test is determined. The time delay is determined by issuing commands to the media system to play pulses of sound through the speaker under test, detecting sound at the desired dead spot using the microphone, and measuring the latency between the time the command to play a pulse is issued and the time the sound is detected by the microphone at the desired dead spot location. Thereafter, control passes back to step 604, where the current UID value is incremented and the next speaker is tested. Note that control also passes back to step 604, if a tone is not detectable in step 610. The first loop thus repeats for each speaker to be tested.

After the speakers of the media center are calibrated in accordance with the first loop and the calibration values for each presentation speaker are stored, in steps 620, 623, 624, the dead spot generating device is calibrated.

In step 620, the dead spot generating device is commanded to play a tone.

In step 622, a dampening coefficient associated with the dead spot generating device is determined. The dampening coefficient may be determined by commanding the dead spot generating device to play tones at various dB levels, detecting each played tone at the dead spot location using the microphone, and determining the difference in dB level between the tone played and the tone detected at the location of the calibration microphone.

In step 623, a sound wave reflection phase shift ϕ value and a displacement (dB) value associated with the dead spot generating device are determined. To determine these values for the dead spot generating device, the dead spot generating device may play sound wave(s), and the calibration microphone may then capture any detected sound and identify standard distortions from the environment, such as reflections, constructive/destructive interference, or other distortions.

In step 624, a time delay for the dead spot generating device is determined. To determine the time delay, the dead spot generating device may be commanded to play one or more pulses, and the microphone may then detect the sound of each pulse. The time delay may be determined by measuring the latency from the time the command to play a pulse was issued to the time the microphone detected the sound of the pulse.

After calibration values for the dead spot generating device have been determined and stored, steps 628, 629, 630, 632, 634, and 636 may be performed. These steps define a second test loop that attempts to utilize the dead spot generating device to neutralized the sound emanating from each presentation speaker.

In step 626, the speaker ID (UID) is re-initialized to zero before entering the second test loop.

In step 628, the speaker identifier (UID) is incremented, and for each loop through the second test loop a different presentation speaker is tested.

In step 629, a check is performed to determine, based on the current UID, if all of the speakers have been tested (in this example, after presentation speaker eleven (UID=11) is tested, the second test loop is exited since the UID will increment to 12 and the result of the check will be “False”).

If all of the speakers have not undergone testing in the second loop, then in step 630, an audio signal is played on the presentation speaker currently under test.

In step 632, an inverted signal (referred to herein also as a “dead spot waveform”) is generated. The inverted signal may be generated based on the audio signal sent to the presentation speaker, an indication of the loudness of the presentation speaker, and characteristics of the sound paths from the presentation speaker and from the dead spot generating device, to the desired dead spot location. These characteristics may be, for example, the calibration values determined for the speaker in steps 612 (damping coefficient), 614 (sound wave reflection phase shift ϕ value and a displacement (dB) value), and 616 (time delay), and the similar values determined for the dead spot generating device in steps 622, 623, and 624, respectively.

In one aspect, an inverted signal may be generated on a per-speaker basis, and then those signals may be summed to form the complete inverted signal. The following set of equations may be used to generate the inverted signal per speaker:

$$V_{C_{S_N}}\left(t_{C_{S_N}}\right) = A_{C_{S_N}} \sin\left(2\pi\left(f_{C_{S_N}} * t_{C_{S_N}}\right) + \phi_{C_{S_N}}\right)$$

$$A_{C_{S_N}} = A_{i_{S_N}} - A_{d_{S_N}} + A_{d_G}$$

$$f_{C_{S_N}} = f_{i_{S_N}} - f_{d_{S_N}} + f_{d_G}$$

$$t_{C_{S_N}} = t_{i_{S_N}} - t_{d_{S_N}} - t_{d_G} - t_P$$

$$\phi_{C_{S_N}} = \phi_{i_{S_N}} - \phi_{d_{S_N}} + \phi_{a_G} + 180°$$

where, $V_{C_{S_N}}(t) =$ signal required to cancel sound from speaker $N$(at a given time)

$A_{C_{S_N}} =$ amplitude required to cancel sound from speaker $N$(dB)

$f_{C_{S_N}} =$ frequency required to cancel sound from speaker $N$(Hz)

$t_{C_{S_N}} =$ timestamp required to cancel sound from speaker $N$(Unix(ms))

$\phi_{C_{S_N}} =$ phase required to cancel sound from speaker $N$(°)

$A_{i_{S_N}} =$ inital amplitude from speaker $N$(dB)

$f_{i_{S_N}} =$ initial frequency from speaker $N$(Hz)

$t_{i_{S_N}} =$ initial time sound played from speaker $N$(Unix(ms))

$\phi_{i_{S_N}} =$ initial phase from speaker $N$(°)

$A_{d_{S_N}} =$ amplitude dampening for speaker $N$ to microphone (dB)

$f_{d_{S_N}} =$ difference in the frequncies from speaker $N$ to microphone(Hz)

$t_{d_{S_N}} =$ time required for sound wave to travel from speaker $N$ to microphone(ms)

-continued $\phi_{d_{S_N}} =$ difference in the phase from speaker $N$ to microphone (°)

$A_{d_G} =$ amplitude dampening from generating device to microphone (dB)

$f_{d_G} =$ difference in the frequncies from generating device to microphone (Hz)

$t_{d_G} =$ time required for sound wave to travel from generating device to microphone (ms)

$\phi_{d_G} =$ difference in the phases from generating device to microphone (°)

$t_P =$ the time required to send and use information about sound waves (from the player to the generating device)

Turning again to FIG. 6, in step 634, the microphone is utilized to determine if sound at the desired dead spot location has effectively been neutralized (i.e., canceled). For example, the sound may be considered to be effectively neutralized or canceled if the microphone does not detect any sound above a predetermined threshold (e.g., in dB).

If not, in step 636, the stored calibration values for the presentation speaker under test and for the dead spot generating device may be adjusted and step 632 may then be repeated.

Once the audio signal playing on the presentation speaker under test is determined to be effectively neutralized, the UID is incremented in step 628 and the process repeats until all of the presentation speakers are tested.

After the calibration process of FIG. 6 has been completed, the final calibration values may be stored for use during normal operation to produce a sound dead spot at the desired location when audio is played on the presentation speakers of the media system. The different calibration values may be combined into a single transformation applied to the audio information (e.g., audio signal) of the audio portion of an audio or audiovisual presentation being played on the media system.

Table 1 provides an example of calibration values generated and stored for the example 11-speaker media system described above in connection with the calibration process of FIG. 6. For each speaker and for the dead spot generating device, the determined sound wave reflection phase shift, displacement, dampening, and time delay values are shown. Table 2 samples values for a list of variables, including Speed of Sound (ft/s), Air Temperature (° F.), Air Pressure (psi), and Processing delay (s), considered when determining the calibration values in Table 1.

TABLE 1

Speaker to Microphone (Dead Spot) Calibration Values

| | | Speaker to Microphone (Dead spot) | | | | | | |
|---|---|---|---|---|---|---|---|---|
| UID | Speaker | Distance (ft) | Delay from distance (s) | Delay from STB to Receiver to Speaker | Sound Wave Reflection Phase Shift φ (°) | Wave Displacement (dB) | Dampening (dB) | Total Time Delay (S) |
| 1 | Front speaker left (FL) | 42 | 0.0383 | 1.538 | 6 | 1.67 | 1.9 | 1.797 |
| 2 | Front speaker right (FR) | 38 | 0.0347 | 1.534 | 8 | 1.87 | 2.1 | 1.793 |
| 3 | Center Speaker (C) | 40 | 0.0365 | 1.536 | 7 | 1.77 | 2 | 1.795 |
| 4 | Surround speaker left (SL) | 39 | 0.0356 | 1.535 | 12 | 4.77 | 5 | 1.794 |

TABLE 1-continued

Speaker to Microphone (Dead Spot) Calibration Values

| | | Speaker to Microphone (Dead spot) | | | | | | | |
|---|---|---|---|---|---|---|---|---|---|
| UID | Speaker | Distance (ft) | Delay from distance (s) | Delay from STB to Receiver to Speaker | Sound Wave Reflection Phase Shift φ (°) | Wave Displacement (dB) | Dampening (dB) | Total Time Delay (S) |
| 5 | Surround speaker right (SR) | 37 | 0.0337 | 1.533 | 14 | 5.27 | 5.5 | 1.792 |
| 6 | Surround back speaker left (SBL) | 35 | 0.0319 | 1.531 | 11 | 4.97 | 5.2 | 1.791 |
| 7 | Surround back speaker right (SBR) | 33 | 0.0301 | 1.530 | 12 | 5.77 | 6 | 1.789 |
| 8 | Front height speaker left (FHL) | 44 | 0.0401 | 1.540 | 9 | 2.07 | 2.3 | 1.799 |
| 9 | Front height speaker right (FHR) | 42 | 0.0383 | 1.538 | 10 | 2.27 | 2.5 | 1.797 |
| 10 | Front wide speaker left (FWL) | 41 | 0.0374 | 1.537 | 17 | 2.77 | 3 | 1.796 |
| 11 | Front wide speaker right (FWR) | 39 | 0.0356 | 1.535 | 19 | 5.77 | 6 | 1.794 |
| * | dead spot generating device | 10 | 0.00913 | 1.509 | 5 | 0.1 | 0.2 | 1.768 |

TABLE 2

Variables for Calibration Value Determinations

| Variables | |
|---|---|
| Speed of Sound (ft/s) | 1095 |
| Air Temperature (° F.) | 70 |
| Air Pressure (psi) | 11.9 |
| Processing delay (s) | 0.25 |

Figure 7:
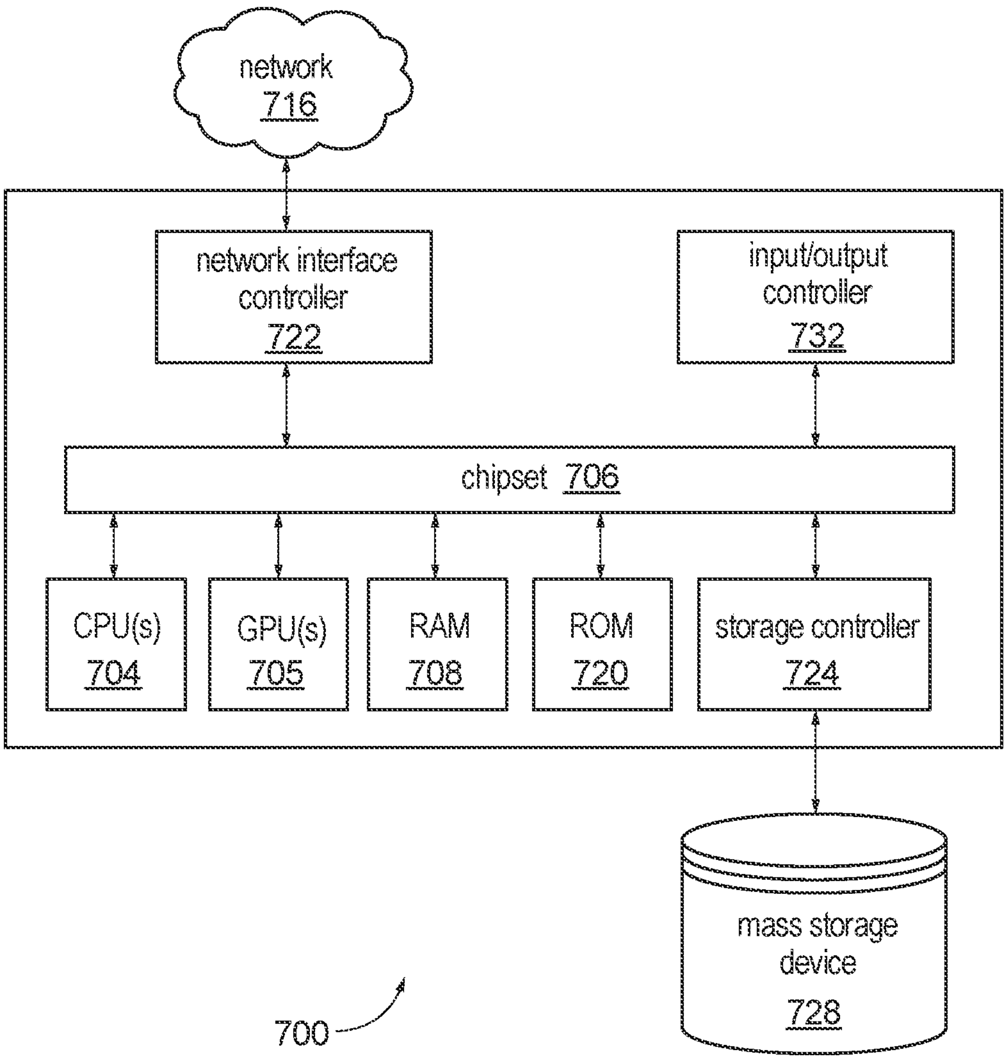
FIG. 7 depicts a computing device that may be used to implement all or portions of the dead spot generating system described herein.

FIG. 7 depicts an example computing device in which the systems and methods disclosed herein, or all or some aspects thereof, may be embodied. For example, components such as the controller 102 of FIGS. 1A-B and the computer 506 of FIG. 5 may be implemented generally in a computing device, such as the computing device 700 of FIG. 7. The computing device of FIG. 7 may be all or part of a server, workstation, desktop computer, laptop, tablet, network appliance, PDA, e-reader, digital cellular phone, set top box, or the like, and may be utilized to implement any of the aspects of the systems and methods described herein, such as to implement the methods described in relation to FIGS. 2 and 6.

The computing device 700 may include a baseboard, or "motherboard," which is a printed circuit board to which a multitude of components or devices may be connected by way of a system bus or other electrical communication paths. One or more central processing units (CPUs) 704 may operate in conjunction with a chipset 706. The CPU(s) 704 may be standard programmable processors that perform arithmetic and logical operations necessary for the operation of the computing device 700.

The CPU(s) 704 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 704 may be augmented with or replaced by other processing units, such as GPU(s) 705. The GPU(s) 705 may comprise processing units specialized for but not necessarily limited to highly parallel computations, such as graphics and other visualization-related processing.

A chipset 706 may provide an interface between the CPU(s) 704 and the remainder of the components and devices on the baseboard. The chipset 706 may provide an interface to a random access memory (RAM) 708 used as the main memory in the computing device 700. The chipset 706 may further provide an interface to a computer-readable storage medium, such as a read-only memory (ROM) 720 or non-volatile RAM (NVRAM) (not shown), for storing basic routines that may help to start up the computing device 700 and to transfer information between the various components and devices. ROM 720 or NVRAM may also store other software components necessary for the operation of the computing device 700 in accordance with the aspects described herein.

The computing device 700 may operate in a networked environment using logical connections to remote computing nodes and computer systems through local area network (LAN) 716. The chipset 706 may include functionality for providing network connectivity through a network interface controller (NIC) 722, such as a gigabit Ethernet adapter. A NIC 722 may be capable of connecting the computing device 700 to other computing nodes over a network 716. It should be appreciated that multiple NICs 722 may be present in the computing device 700, connecting the computing device to other types of networks and remote computer systems.

The computing device 700 may be connected to a mass storage device 728 that provides non-volatile storage for the computer. The mass storage device 728 may store system programs, application programs, other program modules, and data, which have been described in greater detail herein. The mass storage device 728 may be connected to the computing device 700 through a storage controller 724 connected to the chipset 706. The mass storage device 728 may consist of one or more physical storage units. A storage controller 724 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 700 may store data on a mass storage device 728 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 728 is characterized as primary or secondary storage and the like.

For example, the computing device 700 may store information to the mass storage device 728 by issuing instructions through a storage controller 724 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 may further read information from the mass storage device 728 by detecting the physical states or characteristics of one or more particular locations within the physical storage units.

In addition to the mass storage device 728 described above, the computing device 700 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 700.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 728 depicted in FIG. 7, may store an operating system utilized to control the operation of the computing device 700. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 728 may store other system or application programs and data utilized by the computing device 700.

The mass storage device 728 or other computer-readable storage media may also be encoded with computer-executable instructions, which, when loaded into the computing device 700, transforms the computing device from a general-purpose computing system into a special-purpose computer capable of implementing the aspects described herein. These computer-executable instructions transform the computing device 700 by specifying how the CPU(s) 704 transition between states, as described above. The computing device 700 may have access to computer-readable storage media storing computer-executable instructions, which, when executed by the computing device 700, may perform the methods described in relation to FIGS. 2 and 6.

A computing device, such as the computing device 700 depicted in FIG. 7, may also include an input/output controller 732 for receiving and processing input from a number of input devices, such as a keyboard, a mouse, a touchpad, a touch screen, an electronic stylus, or other type of input device. Similarly, an input/output controller 732 may provide output to a display, such as a computer monitor, a flat-panel display, a digital projector, a printer, a plotter, or other type of output device. It will be appreciated that the computing device 700 may not include all of the components shown in FIG. 7, may include other components that are not explicitly shown in FIG. 7, or may utilize an architecture completely different than that shown in FIG. 7.

As described herein, a computing device may be a physical computing device, such as the computing device 700 of FIG. 7. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:

receiving audio information associated with a content item, wherein the audio information is to be output by at least one audio source;

buffering the audio information prior to output by the at least one audio source;

determining, based at least on the buffered audio information, an inverted signal; and causing output, based on the inverted signal, of a sound wave with output of the audio information such that the sound wave at least partially cancels sound being output from the at least one audio source.

2. The method of claim 1, wherein the content item comprises one of an audio or an audiovisual presentation.

3. The method of claim 1, wherein the at least one audio source comprises one or more speakers of a media system.

4. The method of claim 1, wherein the sound wave is output at a selected location and wherein determining the inverted signal comprises determining the inverted signal based on characteristics of a sound path from the at least one audio source to the selected location.

5. The method of claim 4, wherein the characteristics of the sound path from the at least one audio source to the selected location comprise one or more of sound wave reflection phase shift, displacement, dampening, and time delay.

6. The method of claim 4, wherein the characteristics of the sound path from the at least one audio source to the selected location are determined using a calibration process.

7. The method of claim 6, wherein the calibration process employs a microphone positioned at the selected location.

8. The method of claim 1, wherein the sound wave is output at a selected location and the at least one audio source is located in a first room of a premises and the selected location is located in a second room of the premises.

9. A non-transitory computer-readable storage medium storing computer-readable instructions that, when executed by a processor of a computing device, cause the computing device to perform operations comprising:

receiving audio information associated with a content item, wherein the audio information is to be output by at least one audio source;

buffering the audio information prior to output by the at least one audio source;

determining, based at least on the buffered audio information, an inverted signal; and causing output, based on the inverted signal, of a sound wave with output of the audio information such that the sound wave at least partially cancels sound being output from the at least one audio source.

10. The non-transitory computer-readable storage medium of claim 9, wherein the sound wave is output at a selected location and the determining is further based on characteristics of a sound path from the at least one audio source to the selected location.

11. The non-transitory computer-readable storage medium of claim 9, wherein the determining is further based on an indication of loudness at one or more audio sources.

12. The non-transitory computer-readable storage medium of claim 9, wherein the content item comprises one of an audio or an audiovisual presentation.

13. The non-transitory computer-readable storage medium of claim 9, wherein the sound wave is output at a selected location and wherein the at least one audio source is located in a first room of a premises and the selected location is located in a second room of the premises.

14. A device comprising:

one or more processors and a memory, wherein the memory stores computer-executable instructions which, when executed by the one or more processors of a computer, cause the device to:

receive audio information associated with a content item, wherein the audio information is to be output by at least one audio source;

buffer the audio information prior to output by the at least one audio source;

determine, based at least on the buffered audio information, an inverted signal; and cause output, based on the inverted signal, of a sound wave with output of the audio information such that the sound wave at least partially cancels sound being output from the at least one audio source.

15. The device of claim 14, wherein the content item comprises one of an audio or an audiovisual presentation.

16. The device of claim 14, wherein the at least one audio source comprises one or more speakers of a media system.

17. The device of claim 14, wherein the sound wave is output at a selected location and wherein determining the inverted signal comprises determining the inverted signal based on characteristics of a sound path from the at least one audio source to the selected location.

18. The device of claim 17, wherein the characteristics of the sound path from the at least one audio source to the selected location comprise one or more of sound wave reflection phase shift, displacement, dampening, and time delay.

* * * * *